Figure 3:
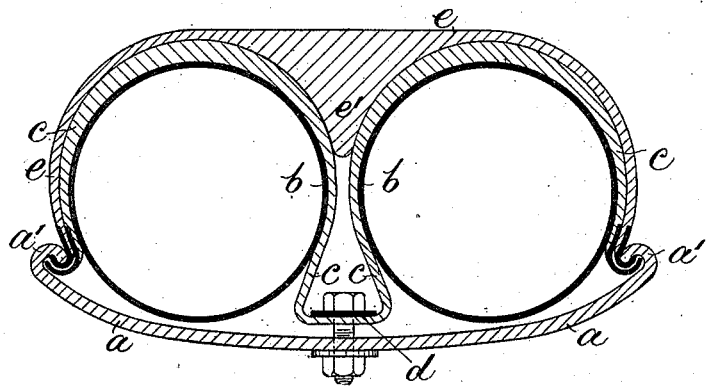

(No Model.)
C. H. TAYLOR.
PNEUMATIC TIRE FOR WHEELS.
No. 600,656.
2 Sheets—Sheet 1.
Patented Mar. 15, 1898.
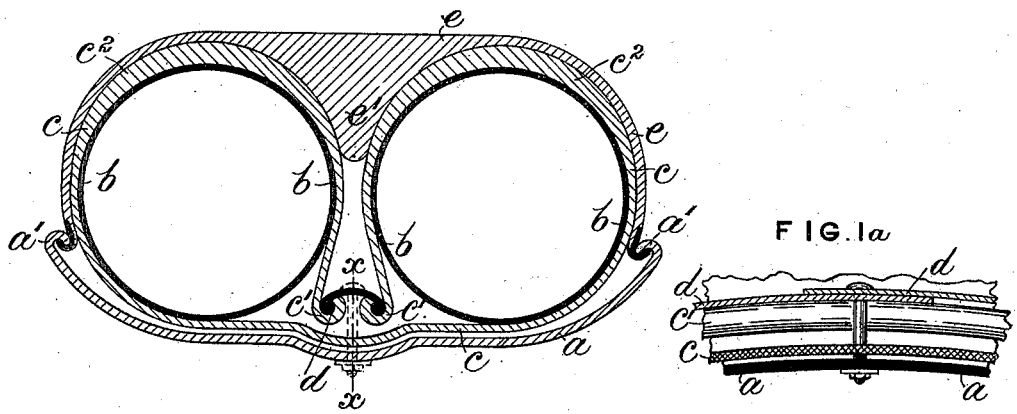
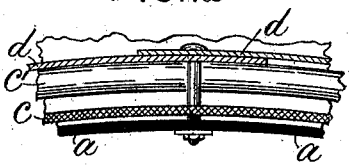
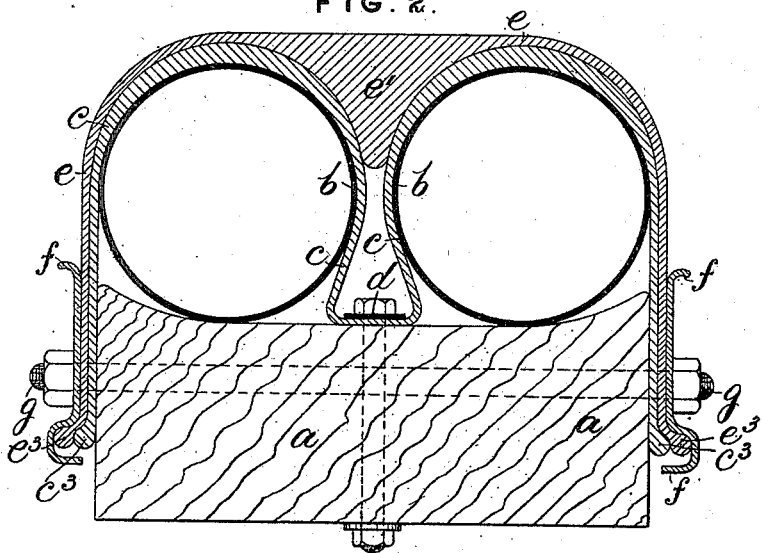
WITNESSES,
George M. Richard
G. M. Lamasure
Inventor
Charles H. Taylor
by Wm H Babcock
Attorney (No Model.) 2 Sheets—Sheet 2.
C. H. TAYLOR.
PNEUMATIC TIRE FOR WHEELS.

No. 600,656. Patented Mar. 15, 1898.

WITNESSES,
George M. Richards
G. M. Lamasure

Inventor
Charles H. Taylor
by Wm H Babcock
Attorney

THE NORRIS PETERS CO., PHOTO-LITHO., WASHINGTON, D. C.

United States Patent Office.

CHARLES H. TAYLOR, OF DIDSBURY, ENGLAND.

PNEUMATIC TIRE FOR WHEELS.

SPECIFICATION forming part of Letters Patent No. 600,656, dated March 15, 1898.

Application filed November 15, 1897. Serial No. 658,637. (No model.) Patented in England December 15, 1896, No. 28,669.

*To all whom it may concern:*

Be it known that I, CHARLES HENRY TAYLOR, a subject of the Queen of Great Britain and Ireland, and a resident of 80 Lansdowne Road, Didsbury, near Manchester, county of Lancaster, England, have invented certain Improvements in Pneumatic Tires for the Wheels of Vehicles, (for which I have applied for British Patent No. 28,669, dated December 15, 1896, complete specification of which was accepted on October 30, 1897,) of which the following is a specification.

My said invention relates generally to pneumatic tires for the wheels of vehicles, and particularly to a form of carriage-tire which has been proposed to be used and in which two elastic or pneumatic tires are placed side by side on or in the wheel-rim or felly. According to the present invention my improved pneumatic tire consists of two inner air-bags furnished with the usual inflating valves or means, and a cover or covers to contain and protect the said air-bags, which are applied in the manner which constitutes the essential feature of my said invention. The wheel-rim or felly, whether of metal or wood, is made wide enough to contain the duplex pneumatic rings which are situated side by side in the rim. The cover or covers are attached by any convenient means to the sides of the felly. That part of the restraining-cover which comes between the air-tubes is drawn down between the air-tubes toward the center of the wheel and is secured to the felly by the means hereinafter described. The restraining-cover may be in one or two pieces and entirely or partly surround the inner tubes.

Although for facility of description I refer only to two inner tubes, it is to be understood that three or more parallel inflating-tubes, secured by a restraining-cover drawn down toward the rim between any two or more of the inflating-tubes, may be used.

The accompanying drawings illustrate various ways of applying my said invention.

Figures 1, 2, 3, and 4 are cross-sections of fellies and tires with the inflating-tubes partly inflated.

Fig. 1 shows the application of my said invention to a metal felly. In this figure, $a$ is the felly, having incurved edges $a'$. $b\ b$ are the inflating-tubes. $c$ is the restraining-cover, which in this case completely encircles the inflating-tubes. The inner edges $c'$ of the restraining-cover are provided with beadings, moldings, or other like projections, which are brought down toward the felly between the inflating-tubes and are secured by a clamping-ring or clamping-plates $d$ by means of bolts or other like means.

Fig. 1$^a$ is a cross-section through $x\ x$ of Fig. 1.

The restraining-cover $c$ may be thickened at $c^2$ in the usual manner to prevent the penetration of the air-tube by sharp objects. Over the restraining-cover $c$ is an outer jacket $e$, which is secured in this case by hooks or the like devices to the incurved edges $a'$ of the felly. To steady the two annular pneumatic cushions thus formed, I may form the outer jacket $e$ with an internal tongue or projecting rib $e'$ to lie between the two cushions and to support them. In this form, in case of accidental deflation of one of the duplex cushions, the carriage might continue to be run on the remaining cushion until the journey is completed.

Fig. 2 shows the application of my said invention to a wheel having a wooden felly $a$. $b\ b$ are the inflating-tubes, as before. $c$ is the restraining-cover. $e$ is the outer jacket. In this case the outside edges of the outer jacket and the restraining-cover are provided with beadings $c^3\ c^3$ and are secured to the felly by side clamping rings or plates $f\ f$ and bolts $g$. The restraining-cover $c$ is brought down, as before, and is secured by a clamping ring or plates $d$ to the felly. In this form I might make the restraining-cover in two pieces— that is to say, divided in the center—and provided with beads or moldings, as at $c'\ c'$ in Fig. 1, as will be well understood without further description.

Fig. 3 shows a method of attaching a restraining-cover, such as shown in Fig. 2, to a metal rim having incurved edges $a'$. In this case both the restraining-cover $c$ and the outer jacket $e$ are provided with metal hooks or the like for insertion under the incurved edges $a'$.

Figure 4:
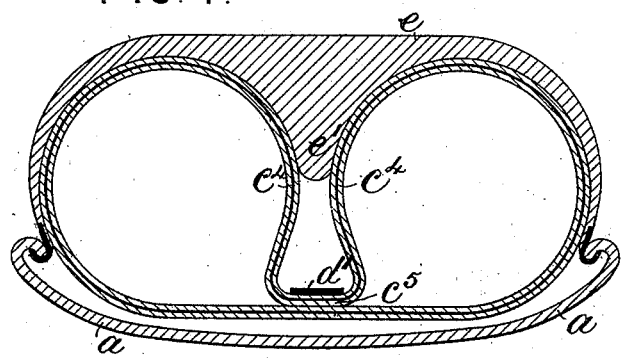

Fig. 4 shows a modification of my said invention, in which the air-tubes and the restraining-cover are combined. In this case the part $c^4$ consists of a rubber tube which may be molded or otherwise fashioned into the form shown in Fig. 4, so as to form duplex air-containing chambers. The whole is strengthened with one or more plies or layers of canvas in order to prevent the indefinite extension of the air-chambers under pressure. A ring or band $d'$ (which is tightened in a circumferential direction by right and left hand screws or by simply pulling in any convenient manner) binds the central part $c^5$ to the felly. The outer jacket $e$ is secured to the felly by any convenient means.

I am aware that it has been proposed to use two or more air-tubes on a single felly, and that clamping-plates of various forms, tire-covers with molded or hooked edges engaging with clamping-rings or corresponding engaging parts in the felly, have been used and applied to various forms of pneumatic tires, and I wish it to be understood that I make no claim to any of these elements in or of themselves; but

What I claim as my invention, and desire to secure by Letters Patent, is—

1. In a pneumatic tire for vehicles, the combination with duplex air-cushions, of a restraining cover or covers extending over the said cushions and down between them, and being fastened to the rim, and an elastic tongue or rib interposed between said cushions outside of the said cover, substantially as set forth.

2. In combination with two annular pneumatic cushions and the rim of a wheel, a cover or covers inclosing the said cushions and extended down between them and fastened to the rim, and an outer jacket also attached to the said rim and having a tongue or rib, $e'$, extending down between the said cushions, substantially as set forth.

3. In combination with two parallel, annular, pneumatic cushions and the tire of a wheel to which they are fitted, a cover or covers inclosing the said tubes separately and having proximate, upwardly-turned edges, $c'$, of an annular connecting-band, $d$, the edges of which fit over and connect the said curved edges, covering the space between them, and fastening-bolts, $x$, which connect the said band to the said tire substantially as set forth.

In testimony whereof I have signed my name to this specification in the presence of two subscribing witnesses.

CHARLES H. TAYLOR.

Witnesses:
JOHN HALL,
A. T. WHITELOW.